US012794084B2

(12) United States Patent
Sun et al.

(10) Patent No.: US 12,794,084 B2
(45) Date of Patent: Nov. 10, 2026

(54) BATTERY CONNECTING MEMBER, BATTERY AND BATTERY MANUFACTURING METHOD

(71) Applicant: CALB Co., Ltd., Jiangsu (CN)

(72) Inventors: Qianqian Sun, Changzhou (CN); Binwei Qi, Luoyang (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 903 days.

(21) Appl. No.: 17/902,906

(22) Filed: Sep. 5, 2022

(65) Prior Publication Data

US 2023/0411795 A1 Dec. 21, 2023

(30) Foreign Application Priority Data

Jun. 17, 2022 (CN) ......................... 202210693163.7

(51) Int. Cl.
*H01M 50/503* (2021.01)
*H01M 50/514* (2021.01)

(52) U.S. Cl.
CPC ....... *H01M 50/503* (2021.01); *H01M 50/514* (2021.01); *H01M 2220/20* (2013.01)

(58) Field of Classification Search
CPC ........... H01M 10/0422; H01M 10/123; H01M 50/107; H01M 50/152; H01M 50/503;
(Continued)

(56) References Cited

U.S. PATENT DOCUMENTS

| | | | |
|---|---|---|---|
| 5,958,088 | A | 9/1999 | Vu et al. |
| 11,101,514 | B2 | 8/2021 | Methe et al. |

(Continued)

FOREIGN PATENT DOCUMENTS

| | | |
|---|---|---|
| CN | 203932170 | 11/2014 |
| CN | 112701422 | 4/2021 |

(Continued)

OTHER PUBLICATIONS

"Search Report of Europe Counterpart Application", issued on Aug. 28, 2023, p. 1-p. 9.

(Continued)

*Primary Examiner* — Brian R Ohara
*Assistant Examiner* — Brent C Thomas
(74) *Attorney, Agent, or Firm* — JCIP GLOBAL INC.

(57) ABSTRACT

A battery connecting member, a battery, and a battery manufacturing method are provided. The battery connecting member is configured to be electrically connected to a cell and a battery casing, and the battery connecting member includes a first connecting portion, a second connecting portion, and a buffering portion. The first connecting portion is configured to be electrically connected to the cell, and the second connecting portion is configured to be electrically connected to the battery casing. Two ends of the buffering portion are respectively connected to the first connecting portion and the second connecting portion. An included angle is provided between the first connecting portion and the second connecting portion, such that a surface of the second connecting portion for electrical connection to the battery casing is inclined to a surface of the first connecting portion for electrical connection to the cell.

14 Claims, 11 Drawing Sheets

(58) Field of Classification Search
CPC . H01M 50/514; H01M 50/528; H01M 50/545
See application file for complete search history.

(56) References Cited

U.S. PATENT DOCUMENTS

| | | | | |
|---|---|---|---|---|
| 2004/0234849 A1* | 11/2004 | Akita | H01M 50/533 | 429/211 |
| 2005/0238951 A1* | 10/2005 | Yoo | H01M 10/0431 | 429/163 |
| 2008/0038629 A1* | 2/2008 | Okabe | H01M 10/052 | 429/121 |

FOREIGN PATENT DOCUMENTS

| | | |
|---|---|---|
| CN | 214378756 | 10/2021 |
| CN | 114094162 | 2/2022 |
| CN | 114628866 | 6/2022 |
| CN | 218039542 | 12/2022 |

OTHER PUBLICATIONS

"Office Action of China Counterpart Application", issued on Oct. 31, 2025, p. 1-p. 7.

"Examination Report of India Counterpart Application", issued on Feb. 24, 2026, p. 1-p. 10.

* cited by examiner

BATTERY CONNECTING MEMBER, BATTERY AND BATTERY MANUFACTURING METHOD

CROSS-REFERENCE TO RELATED APPLICATION

This application claims the priority benefit of China application no. 202210693163.7, filed on Jun. 17, 2022. The entirety of the above-mentioned patent application is hereby incorporated by reference herein and made a part of this specification.

BACKGROUND

Technical Field

The disclosure relates to the field of battery technology, and in particular, relates to a battery connecting member, a battery, and a battery manufacturing method.

Description of Related Art With the development and progress of technology, the use of electric vehicles is gradually widespread. A battery pack is provided in an electric vehicle, and the battery pack is used to store electric energy and provide energy to the electric vehicle. A plurality of batteries are usually provided in a battery pack, each battery includes a battery casing and a cell, and the battery casing may act as the electrode of the battery, and in this case, the cell and the battery casing need to be electrically connected.

It is noted that the above-mentioned information disclosed in the background section is only used to strengthen the understanding of the background of the disclosure, and therefore it may include information that does not constitute the prior art known to a person having ordinary skill in the art.

SUMMARY

The disclosure provides a battery connecting member, a battery, and a battery manufacturing method.

According to the first aspect of the disclosure, the disclosure provides a battery connecting member configured to electrically connect a cell and a battery casing, and the battery connecting member includes a first connecting portion, a second connecting portion, and a buffering portion. The first connecting portion is configured to be electrically connected to the cell. The second connecting portion is configured to be electrically connected to the battery casing. Two ends of the buffering portion are respectively connected to the first connecting portion and the second connecting portion. An included angle is provided between the first connecting portion and the second connecting portion, such that a surface of the second connecting portion for electrical connection to the battery casing is inclined to a surface of the first connecting portion for electrical connection to the cell.

According to the second aspect of the disclosure, the disclosure further provides a battery, and the battery includes the abovementioned battery connecting member.

According to the third aspect of the disclosure, the disclosure further provides a battery manufacturing method, and the method includes the following steps. A first connecting portion and a second connecting portion of a battery connecting member are respectively connected to a cell and a casing piece of a battery casing. The first connecting portion and the second connecting portion are connected to each other through a buffering portion. An included angle is provided between the first connecting portion and the second connecting portion, such that a surface of the second connecting portion for electrical connection to the battery casing is inclined to a surface of the first connecting portion for electrical connection to the cell. The casing piece is compressed to drive the second connecting portion to concave inward to form a recess to press the battery casing and the second connecting portion. The first cover plate of the battery casing is hermetically connected to the casing piece.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
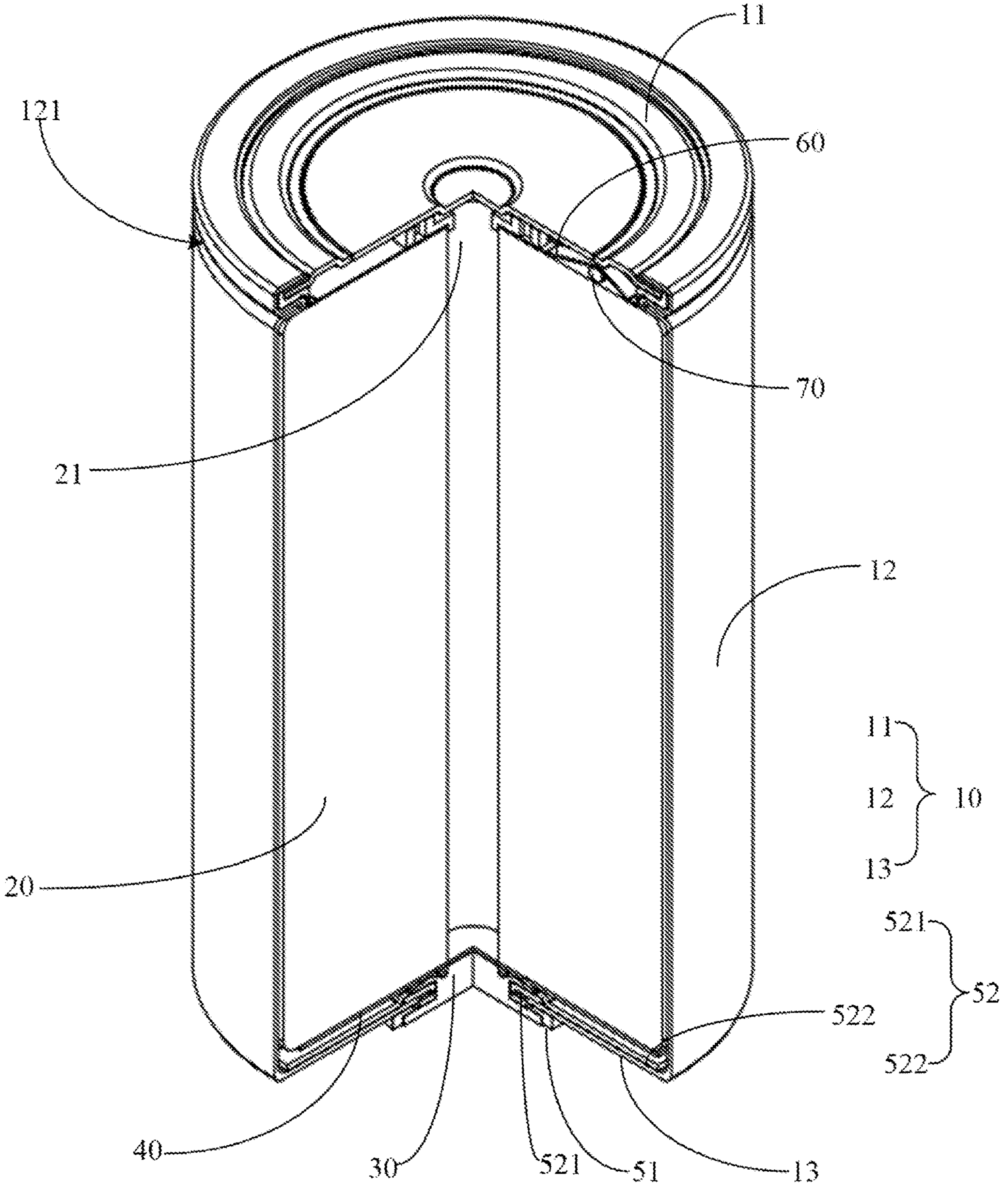
FIG. 1 is a fragmentary cross-sectional view of a battery according to an exemplary embodiment of the disclosure.
Figure 2:
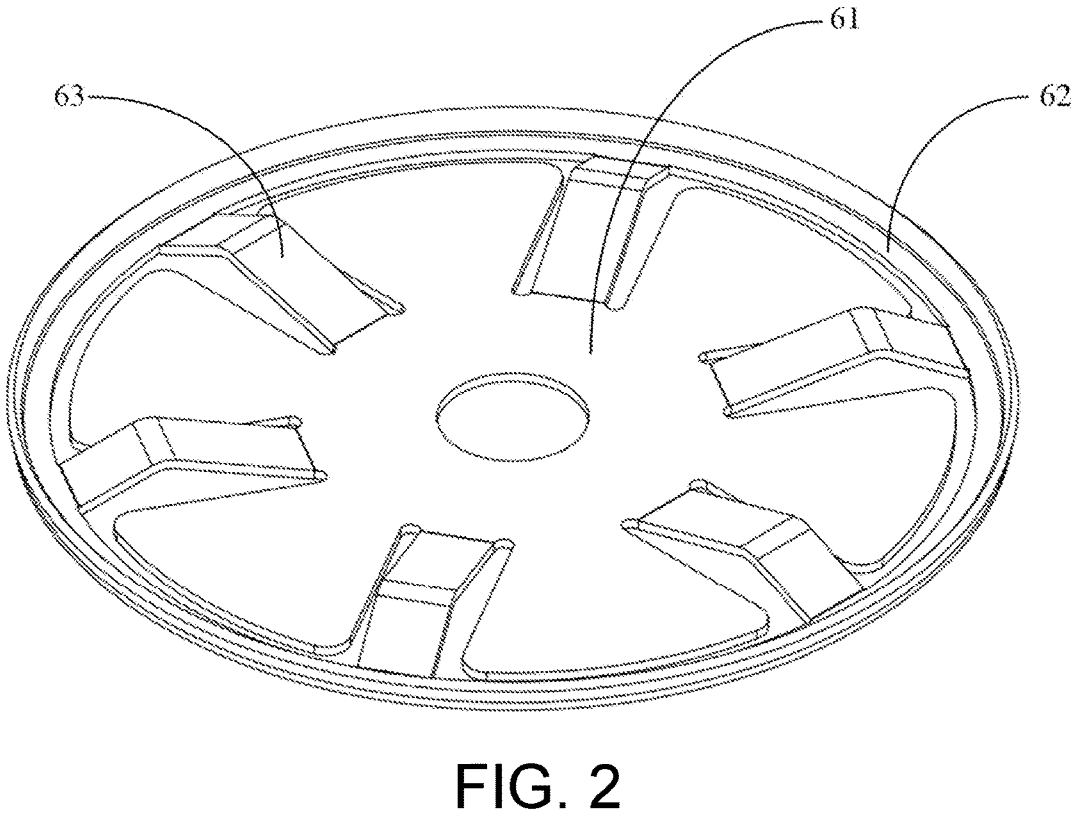
FIG. 2 is a schematic view of a battery connecting member according to an exemplary embodiment of the disclosure.

In the exemplary embodiments of the disclosure, first of all, a battery connecting member 60 is provided, and a shown in FIG. 1 and FIG. 2, the battery connecting member 60 is configured to electrically connect a cell 20 and a battery casing 10. The battery connecting member 60 includes a first connecting portion 61, a second connecting portion 62, and a buffering portion 63. The first connecting portion 61 is configured to be electrically connected to the cell 20, and the second connecting portion 62 is configured to be electrically connected to the battery casing 10. Two ends of the buffering portion 63 are respectively connected to the first connecting portion 61 and the second connecting portion 62. An included angle is provided between the first connecting portion 61 and the second connecting portion 62, such that a surface of the second connecting portion 62 for electrical connection to the battery casing 10 is inclined to a surface of the first connecting portion 61 for electrical connection to the cell 20.

The battery connecting member 60 provided by the embodiments of the disclosure includes the first connecting portion 61 and the second connecting portion 62. The first connecting portion 61 is configured to be connected to the cell 20, and the second connecting portion 62 is configured to be connected to the battery casing 10. The first connecting portion 61 and the second connecting portion 62 are connected to each other through the buffering portion 63, so that the cell 20 is connected to the battery casing 10. Further, the surface of the second connecting portion 62 configured to be electrically connected to the battery casing 10 is inclined to the first connecting portion 61, and in this way, the connection area between the second connecting portion 62 and the battery casing 10 increases, the overcurrent capability is improved, and the connection stability between the battery casing 10 and the battery connecting member 60 is raised. Further, the first connecting portion 61 and the second connecting portion 62 are independently arranged, such that the stress concentration may be prevented from being generated by the battery connecting member 60 during installation and transportation, and the battery connecting member 60 may be protected from being damaged by the stress concentration.

Components of the battery connecting member 60 provided by the embodiments of the disclosure are described in detail as follows.

Figure 3:
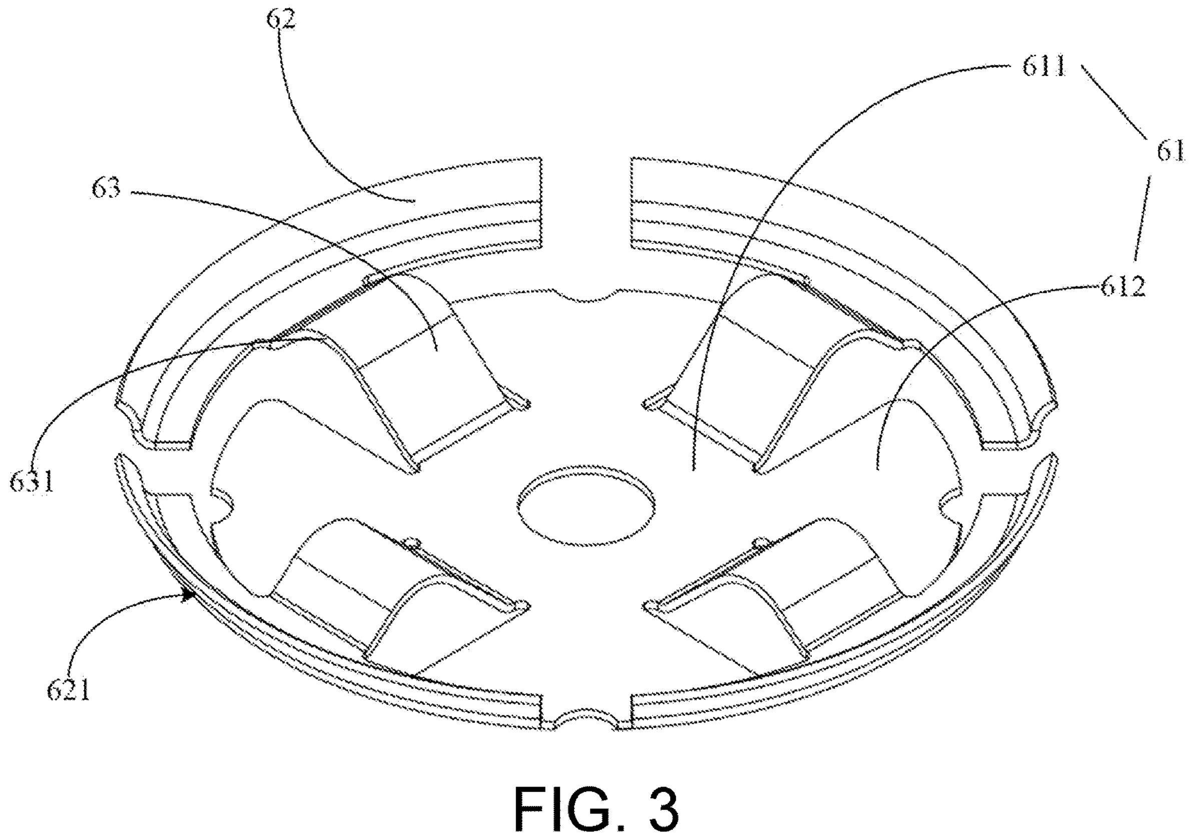
FIG. 3 is a schematic view of another battery connecting member according to an exemplary embodiment of the disclosure.
Figure 4:
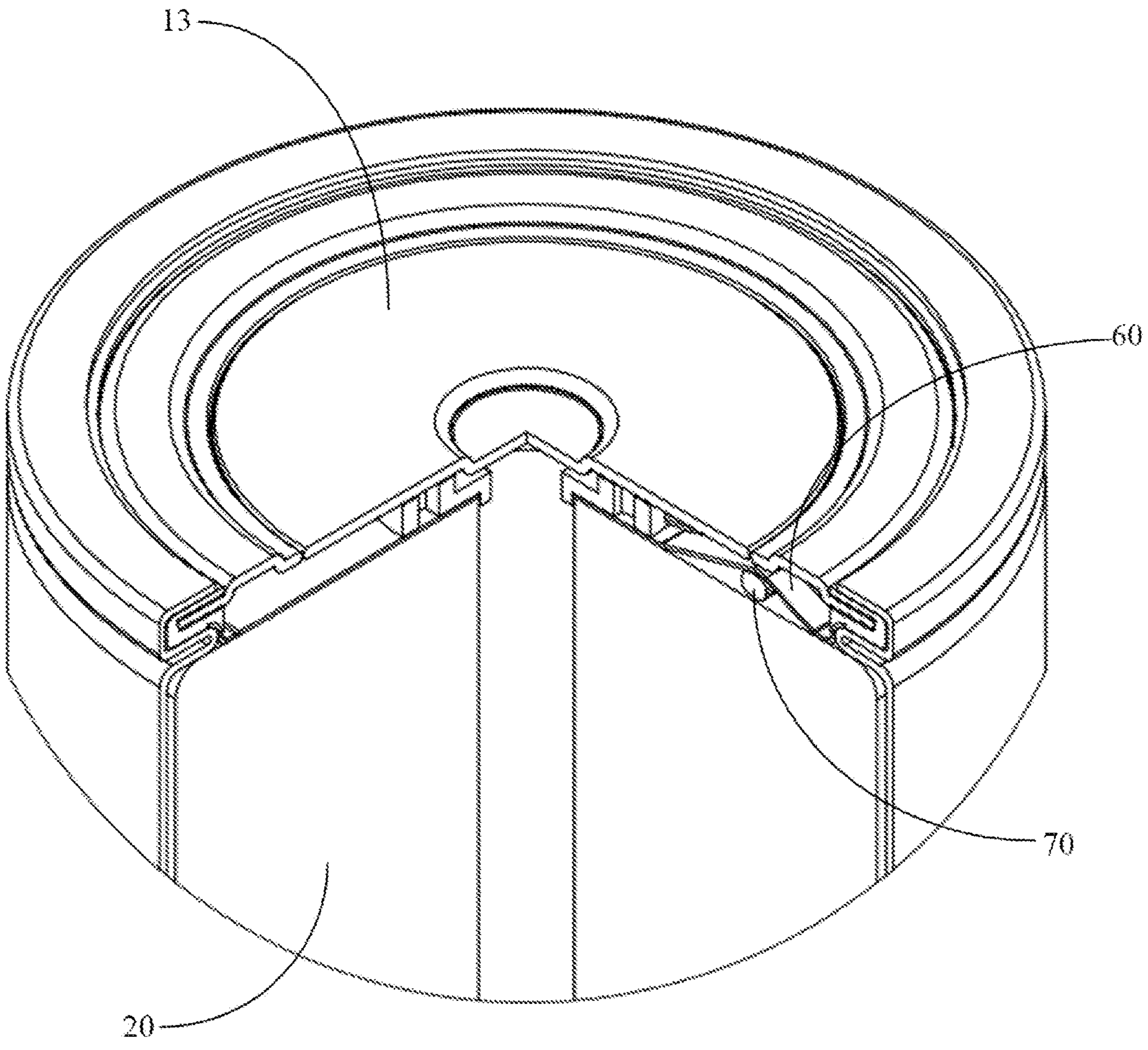
FIG. 4 is a partial and fragmentary cross-sectional view of another battery according to an exemplary embodiment of the disclosure.
Figure 5:
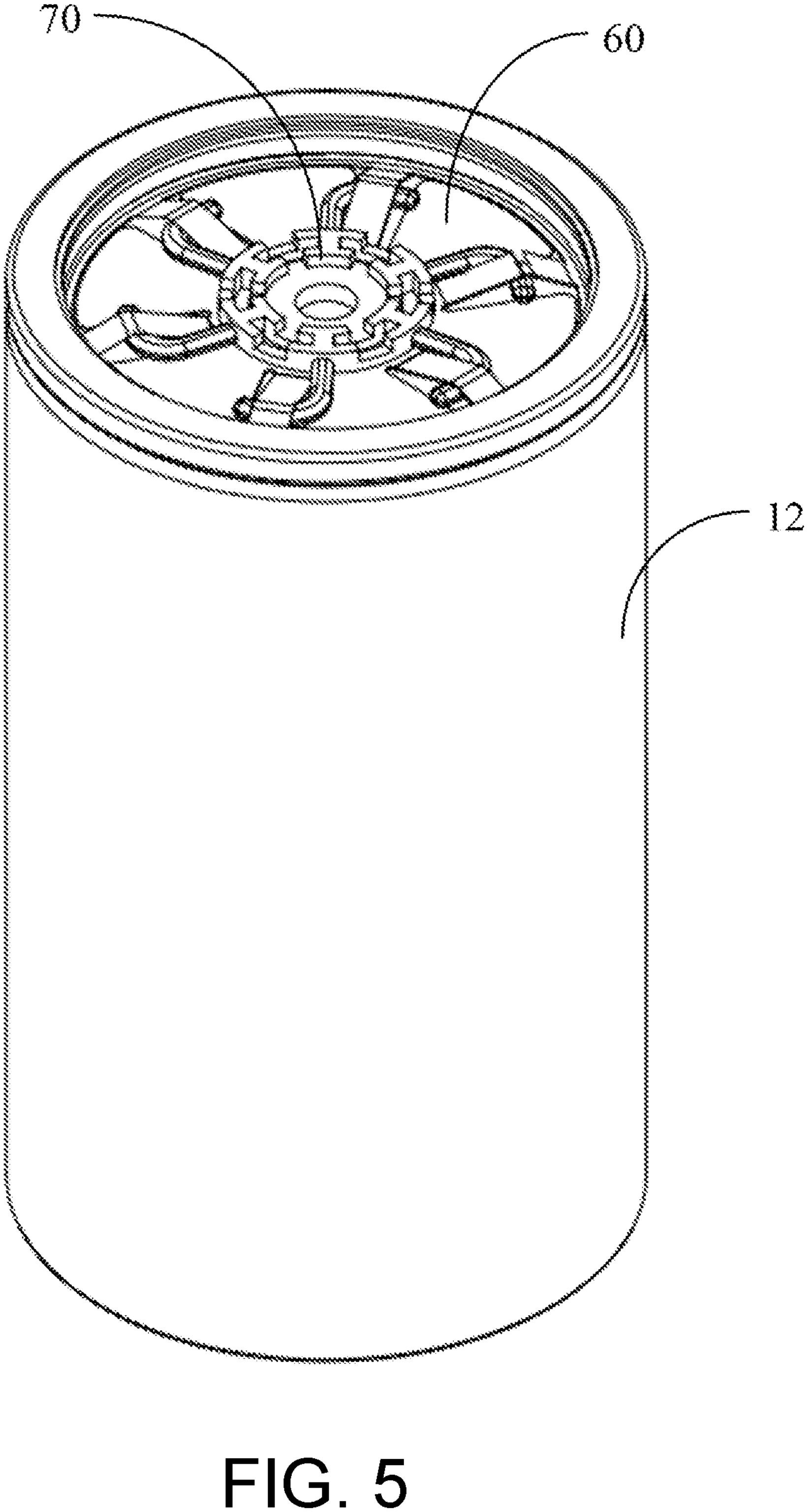
FIG. 5 is a schematic view of a battery according to an exemplary embodiment of the disclosure.
Figure 6:
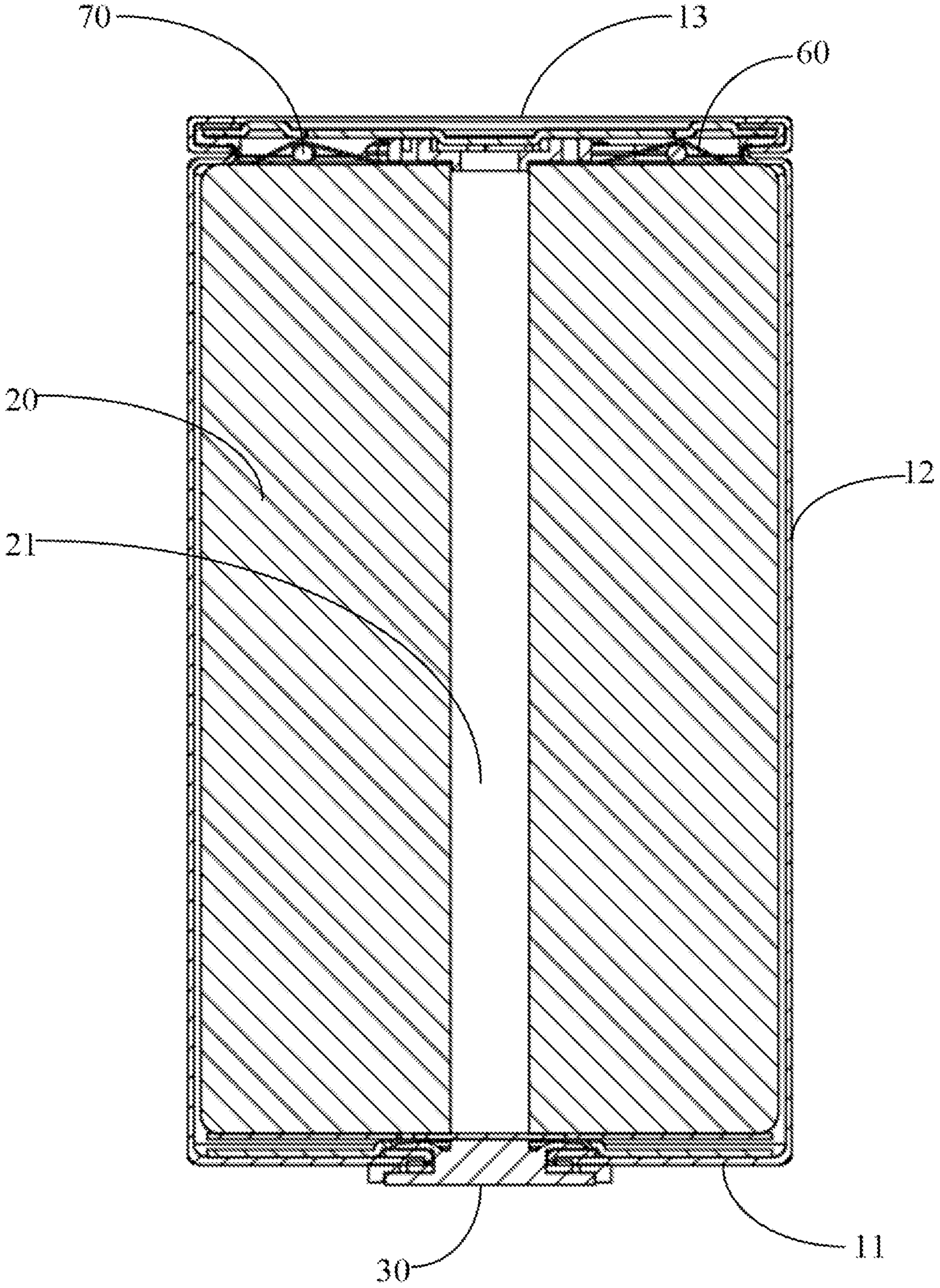
FIG. 6 is a cross-sectional view of the battery according to an exemplary embodiment of the disclosure.

As shown in FIG. 3, the first connecting portion 61 includes a connecting body 611 and a plurality of connecting sheets 612. The connecting sheets 612 are connected to the connecting body 611, a spacing is provided between adjacent connecting sheets 612 among the connecting sheets 612, and the connecting sheets 612 are configured to be connected to the cell 20.

The connecting sheets 612 may be distributed around the connecting body 611. For instance, the connecting body 611 may have a circular structure, and the connecting sheets 612 may be evenly distributed on the edge of the connecting body 611 in the circumferential direction. For instance, the first connecting portion 61 includes four connecting sheets 612, and the four connecting sheets 612 are evenly distributed on the edge of the connecting body 611.

The connecting sheets 612 are configured to be connected to the cell 20, a plurality of tabs may be provided on the cell 20, each connecting sheet 612 corresponds to at least one of the tabs, and the connecting sheet 612 is welded to the corresponding tab. For instance, the connecting sheets 612 and the tabs may be welded by laser welding.

In the embodiments of the disclosure, the tabs connected to the connecting sheets 612 may be negative tabs, that is, the battery casing 10 is the negative electrode of the battery. Certainly, in practical applications, the battery casing 10 may also act as the positive electrode of the battery, and in this case, the tabs connected to the connecting sheets 612 are the positive tabs, but the embodiments of the disclosure are not limited thereto.

A spacing is provided between two adjacent connecting sheets 612 among the connecting sheets 612, a minimum distance between two adjacent connecting sheets 612 is 3 mm to 15 mm. For instance, the minimum distance between two adjacent connecting sheets 612 is 3 mm, 5 mm, 8 mm, 9 mm, 10 mm, or 15 mm. The minimum distance between two connecting sheets 612 refers to the width where the interval width between two adjacent connecting sheets 612 is the smallest.

It is noted that in the embodiments of the disclosure, the first connecting portion 61 is an integral structure, and the first connecting portion 61 may be obtained by cutting a plate material, for example. A plurality of separation grooves are formed by cutting on the plate material, the ends of the separation grooves are the connecting body 611, and the two sides of the separation grooves are the connecting sheets 612. Certainly, in practical applications, the connecting body 611 and the connecting sheets 612 of the first connecting portion 61 may also be of a separate structure, and the embodiments of the disclosure are not limited thereto.

The battery connecting member 60 may also be provided with a plurality of second connecting portions 62, and the second connecting portions 62 are arranged at intervals. A distance between two adjacent second connecting portions 62 among the second connecting portions is 2 mm to 20 mm. For instance, the plurality of second connecting portions 62 may be evenly distributed along the circumference, spacings are provided among the plurality of second connecting portions, and the spacings may be rectangular or approximately rectangular through grooves. The distance between two adjacent second connecting portions 62 may be 2 mm to 20 mm, for instance, the distance between two adjacent second connecting portions 62 is 2 mm, 3 mm, 5 mm, 8 mm, 13 mm, 18 mm, or 20 mm.

Through arrangement of the spacings among the second connecting portions 62, it can be ensured that a space for retraction is provided when the battery connecting member 60 retracts from a large circle to a small circle, such that interference is prevented from occurring, and the retraction of the battery connecting member 60 is facilitated.

Correspondingly, the battery connecting member 60 may include a plurality of buffering portions 63, each of the second connecting portions 62 is correspondingly connected to one of the buffering portions 63, and each spacing on the first connecting portion 61 is correspondingly connected to one buffering portion 63. For instance, the first connecting portion 61 may be provided with four connecting sheets 612. Herein, four spacings are provided on the first connecting portion 61, and four buffering portions 63 and four second connecting portions 62 are correspondingly provided in the battery connecting member 60.

In the embodiments of the disclosure, the included angle between the first connecting portion 61 and the second connecting portion 62 may be greater than 0 degrees and less than 180 degrees. Preferably, the included angle between the first connecting portion 61 and the second connecting portion 62 is 90 degrees.

The second connecting portion 62 has a first recess 621 extending inward, and a side of the second connecting portion 62 facing the buffering portion 63 is an inner side. The first recess 621 on the second connecting portion 62 is formed by hemming the battery casing 10 and the second connecting portion 62. In the initial state, the second connecting portion 62 does not have the first recess 621, and the second connecting portion 62 may be a cylindrical surface. After the battery casing 10 and the second connecting portion 62 are subjected to a hemming process, the first recess 621 is formed on the second connecting portion 62, and a second recess 121 is formed on the battery casing 10.

The buffering portion 63 is connected to the first connecting portion 61 and the second connecting portion 62, and the buffering portion 63 may be an elastic buffering portion 63. The buffering portion 63 may be elastically deformed, and the buffering portion 63 may provide buffering effect when the second connecting portion 62 and the battery casing 10 are hemmed to avoid stress concentration on the battery connecting member 60. Moreover, the buffering portion 63 separates the first connecting portion 61 and the second connecting portion 62, so as to prevent the first connecting portion 61 and the second connecting portion 62 from affecting each other, thereby ensuring the connection stability of each connecting portion.

The buffering portion 63 has a bent sub-portion 631, and the bent sub-portion 631 protrudes from a surface of the first connecting portion 61 away from the cell 20 to form a guide space between the buffering portion 63 and the first connecting portion 61, and the guide space is configured to accommodate a fixing claw 71.

Exemplarily, the buffering portion 63 may include a first bending section and a second bending section. A first end of the first bending section is connected to the second connecting portion 62, a second end of the first bending section is connected to a first end of the second bending section, and a second end of the second bending section is connected to the first connecting portion 61. The second end of the first bending section is farther away from the cell 20 than the first end of the first bending section, and the second end of the first bending section protrudes from the surface of the first connecting portion 61 away from the cell 20. The second end of the second bending section is closer to the cell 20 than the first end of the second bending section, and the first end of the second bending section protrudes from the surface of the first connecting portion 61 away from the cell 20.

Exemplarily, a width of the buffering portion 63 provided by the embodiments of the disclosure is 2 mm to 10 mm, and/or a length of the buffering portion 63 is 5 mm to 20 mm. For instance, the width of the buffering portion 63 is 2 mm, 3 mm, 6 mm, 9 mm, or 10 mm, and the length of the buffering portion 63 is 5 mm, 6 mm, 9 mm, 12 mm, 17 mm, or 20 mm.

It is noted that in the embodiments of the disclosure, the first connecting portion 61, the second connecting portion 62, and the buffering portion 63 may be an integral structure, and the battery connecting member 60 may be obtained by cutting and bending a plate material, for example. Certainly, in practical applications, the first connecting portion 61, the second connecting portion 62, and the buffering portion 63 may also be of a separate structure, and the embodiments of the disclosure are not limited thereto.

In the embodiments of the disclosure, the battery connecting member 60 is made of a conductor material. For instance, the material of the battery connecting member 60 may be copper, aluminum, iron, silver, zinc, tungsten, titanium, titanium alloy, or aluminum alloy.

The battery connecting member 60 provided by the embodiments of the disclosure includes the first connecting portion 61 and the second connecting portion 62. The first connecting portion 61 is configured to be connected to the cell 20, and the second connecting portion 62 is configured to be connected to the battery casing 10. The first connecting portion 61 and the second connecting portion 62 are connected to each other through the buffering portion 63, so that the cell 20 is connected to the battery casing 10. Further, the surface of the second connecting portion 62 configured to be electrically connected to the battery casing 10 is inclined to the first connecting portion 61, and in this way, the connection area between the second connecting portion 62 and the battery casing 10 increases, the overcurrent capability is improved, and the connection stability between the battery casing 10 and the battery connecting member 60 is raised. Further, the first connecting portion 61 and the second connecting portion 62 are independently arranged, and in this way, the stress concentration may be prevented from being generated by the battery connecting member 60 during installation and transportation, and the battery connecting member 60 may be protected from being damaged by the stress concentration.

The exemplary embodiments of the disclosure further provide a battery, and the battery includes the abovementioned battery connecting member 60. Herein, the battery connecting member 60 includes the first connecting portion 61, the second connecting portion 62, and the buffering portion 63. The first connecting portion 61 is configured to be electrically connected to the cell 20, and the second connecting portion 62 is configured to be electrically connected to the battery casing 10. Two ends of the buffering portion 63 are respectively connected to the first connecting portion 61 and the second connecting portion 62. An included angle is provided between the first connecting portion 61 and the second connecting portion 62, such that a surface of the second connecting portion 62 for electrical connection to the battery casing 10 is inclined to a surface of the first connecting portion 61 for electrical connection to the cell 20.

The battery provided by the embodiments of the disclosure includes the battery connecting member 60. The first connecting portion 61 and the second connecting portion 62 in the battery connecting member 60 are respectively configured to be connected to the cell 20 and the battery casing 10. The first connecting portion 61 and the second connecting portion 62 are connected to each other through the buffering portion 63, so that the cell 20 is connected to the battery casing 10. Further, the surface of the second connecting portion 62 configured to be electrically connected to the battery casing 10 is inclined to the first connecting portion 61, and in this way, the connection area between the second connecting portion 62 and the battery casing 10 increases, the overcurrent capability is improved, and the connection stability between the battery casing 10 and the battery connecting member 60 is raised.

Further, the battery provided by the embodiments of the disclosure may also include the battery casing 10, the cell 20, and a support piece 70. The cell 20 is disposed inside the battery casing 10, and the first connecting portion 61 and the second connecting portion 62 of the battery connecting member 60 are respectively connected to the cell 20 and the battery casing 10. The support piece 70 is disposed on the battery connecting member 60. A plurality of fixing claws 71 are disposed on the support piece 70, the fixing claws 71 are located on a side of the buffering portion 63 facing the cell 20, and the fixing claws 71 are engaged with the battery connecting member 60. By arranging the fixing claws 71 of the support piece 70 on the side of the buffering portion 63 facing the cell 20, the deformation of the buffering portion 63 may be guided, thereby preventing the buffering portion 63 from being deformed towards the cell 20.

Further, the battery provided by the embodiments of the disclosure may also include a pole assembly 30, a first insulating piece 51, a second insulating piece 52, and a current collecting plate 40. The pole assembly 30 is disposed at one end of the battery casing 10 away from the battery connecting member 60, and the pole assembly 30 is electrically connected to the cell 20 through the current collecting plate 40. The first insulating piece 51 is disposed between the battery casing 10 and the pole assembly 30 to achieve insulation between the battery casing 10 and the pole assembly 30. The first insulating piece 51 includes a first insulator 511 and a second insulator 512 which are separately arranged. The first insulator 511 is connected to the pole assembly 30, and the second insulator 512 is connected to the first insulator 511.

Components of the battery provided by the embodiments of the disclosure are described in detail as follows.

The battery casing 10 is used to form the outer contour of the battery, and the battery casing 10 can protect the internal structure of the battery. The battery casing 10 has an accommodating cavity, and the cell 20 is disposed in the accommodating cavity of the battery casing 10. The pole assembly 30 is disposed in the battery casing 10, and at least a part of the pole assembly 30 is located in the accommodating cavity.

The battery casing 10 may include a casing piece 12 and a first cover plate 11, and one end of the casing piece 12 has an opening. The first cover plate 11 is connected to the casing piece 12, the first cover plate 11 is located at the opening of the casing piece 12, and the end portion of the casing piece 12 is closed through the connection of the first cover plate 11 and the casing piece 12. The casing piece 12 is provided with the second recess 121 extending inward, and the second recess 121 is matched with the first recess 621 of the second connecting portion 62 to realize the hermetic connection of the battery casing 10 and the battery connecting member 60.

Exemplarily, the battery provided by the embodiments of the disclosure may be a cylindrical battery. Based on the above, the battery casing 10 may be a hollow cylinder or a structure similar to a hollow cylinder. The battery casing 10 is a thin-walled structure, and the thickness of the thin wall of the battery casing 10 may be the same or different at different positions. The first cover plate 11 is a thin wall on one bottom surface of the hollow cylinder, and the casing piece 12 may include a thin wall on the other bottom surface of the hollow cylinder and a thin wall on the side surface of the hollow cylinder.

The first cover plate 11 contacts the buffering portion 63, and a predetermined preload force is provided between the first cover plate 11 and the buffering portion 63 to press the battery connecting member 60 through the first cover plate 11. The pressed buffering portion 63 may apply pressure to the second connecting portion 62, so as to ensure the pressing between the second connecting portion 62 and the battery casing 10.

In a practical embodiment, the battery casing 10 may further include a second cover plate 13, and the second cover plate 13 is disposed on one side of the casing piece 12 away from the first cover plate 11. The second cover plate 13 and the casing piece 12 may be an integral structure, and the second cover plate 13 and the casing piece 12 may be formed by stamping, machining, or casting, for example. Alternatively, the second cover plate 13 and the casing piece 12 may be of a separate structure, and the second cover plate 13 and the casing piece 12 may be connected by welding, rolling, or glue connection.

An installation through hole may be provided on the second cover plate 13, and the pole assembly 30 passes through the installation through hole. Further, a sealing piece may be provided at the installation through hole, and the sealing piece seals the installation through hole and the pole assembly 30 to prevent the electrolyte solution inside the battery from leaking out of the installation through hole.

In the embodiments of the disclosure, the battery casing 10 is made of a metal material, for example, the material of the battery casing 10 may be steel, aluminum, copper, or silver. In the battery casing 10, the first cover plate 11, the casing piece 12, and the second cover plate 13 may be made of the same materials, or the first cover plate 11, the casing piece 12, and the second cover plate 13 may be made of different materials. The thicknesses of the first cover plate 11, the second cover plate 13, and the casing piece 12 may be the same, or the thickness of the first cover plate 11, the second cover plate 13, and the casing piece 12 may be different.

The cell 20 is disposed in the battery casing 10, and the cell 20 refers to a unit formed by winding or laminating a stacked part, and the stacked part includes a first electrode, a separator, and a second electrode. When the first electrode is a positive electrode, the second electrode is a negative electrode. The polarities of the first electrode and the second electrode may be interchanged.

The cell 20 is connected to the current collecting plate 40 and the battery connecting member 60, the current collecting plate 40 is connected to the pole assembly 30, and the electrical connection between the cell 20 and the pole assembly 30 is thereby achieved. The battery connecting member 60 is connected to the battery casing 10, and the electrical connection between the battery casing 10 and the cell 20 is thereby achieved. The shape of the cell 20 may match the shape of the battery. For instance, when the battery is a cylindrical battery, the cell 20 may have a cylindrical or approximately cylindrical structure.

The cell 20 may include a cell body and a tab, the tab protrudes from the end portion of the cell body, and the tab is used to be connected to the current collecting plate 40. Exemplarily, the cell body may be provided with a first tab and a second tab, the first tab is arranged on one end of the cell body, and the second tab is arranged on the other end of the cell body. The first tab may be a positive tab, and the second tab may be a negative tab. The first tab is arranged at one end of the cell body close to the pole assembly 30, and the second tab is arranged at the other end of the cell body away from the pole assembly 30. The first tab may be welded with the current collecting plate 40, and the second tab may be welded with the battery connecting member 60.

The cell body may include a first electrode sheet, a second electrode sheet, and a diaphragm. The first tab is disposed on the first electrode sheet, the second tab is disposed on the second electrode sheet, and the first electrode sheet and the second electrode sheet are separated by the diaphragm to form the cell body.

To be specific, the cell 20 provided by the embodiments of the disclosure may be a roll core 20. That is, by winding the first electrode sheet, the second electrode sheet having electrical properties that are opposite to the first electrode sheet, and the diaphragm sheet disposed between the first electrode sheet and the second electrode sheet, the roll core 20 is obtained.

Certainly, in practical applications, the cell 20 may also be a laminated cell 20, and the embodiments of the disclosure are not limited thereto. The cell 20 has first electrode sheets that are stacked on each other, second electrode sheets having electrical properties that are opposite to the first electrode sheets, and diaphragm sheets disposed between the first electrode sheets and the second electrode sheets. Therefore, multiple pairs of the first electrode sheets and the second electrode sheets are stacked to form the laminated cell 20.

Figure 12:
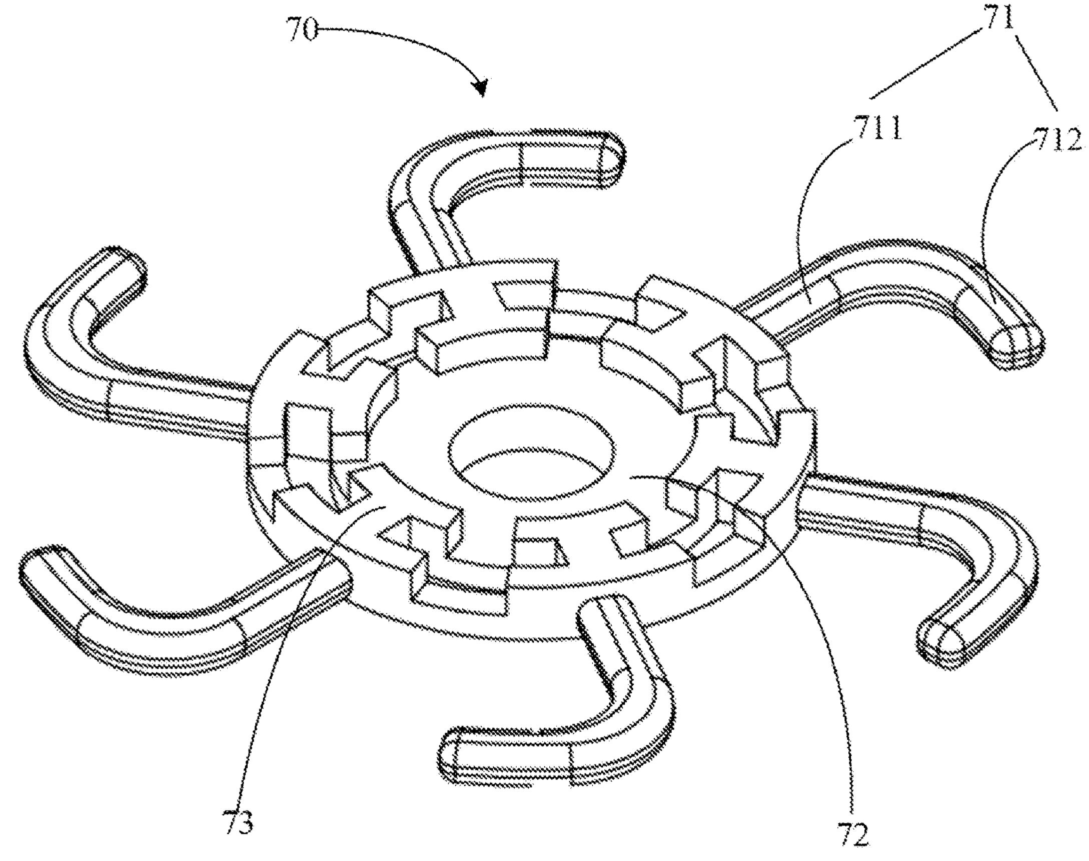
FIG. 12 is a schematic view of a support piece according to an exemplary embodiment of the disclosure.
Figure 13:
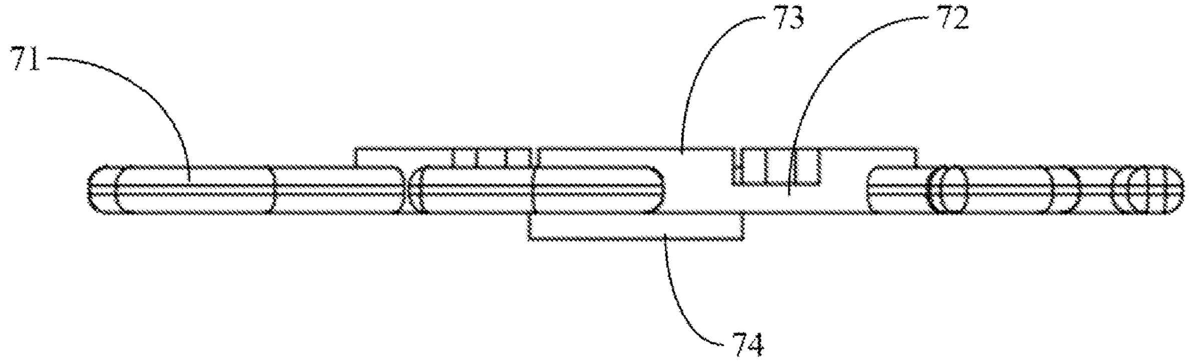
FIG. 13 is a schematic view of another support piece according to an exemplary embodiment of the disclosure.
Figure 14:
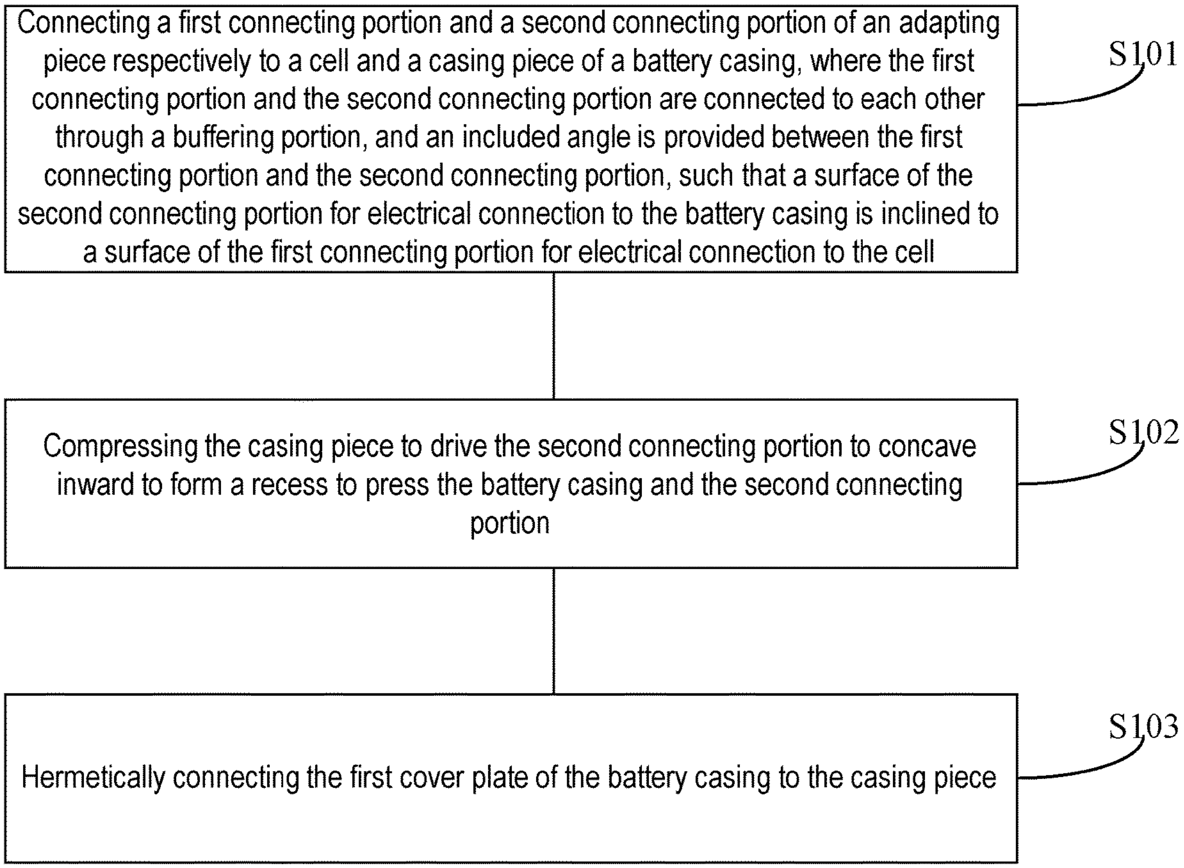
FIG. 14 is a flow chart of a battery manufacturing method according to an exemplary embodiment of the disclosure.
Figure 15:
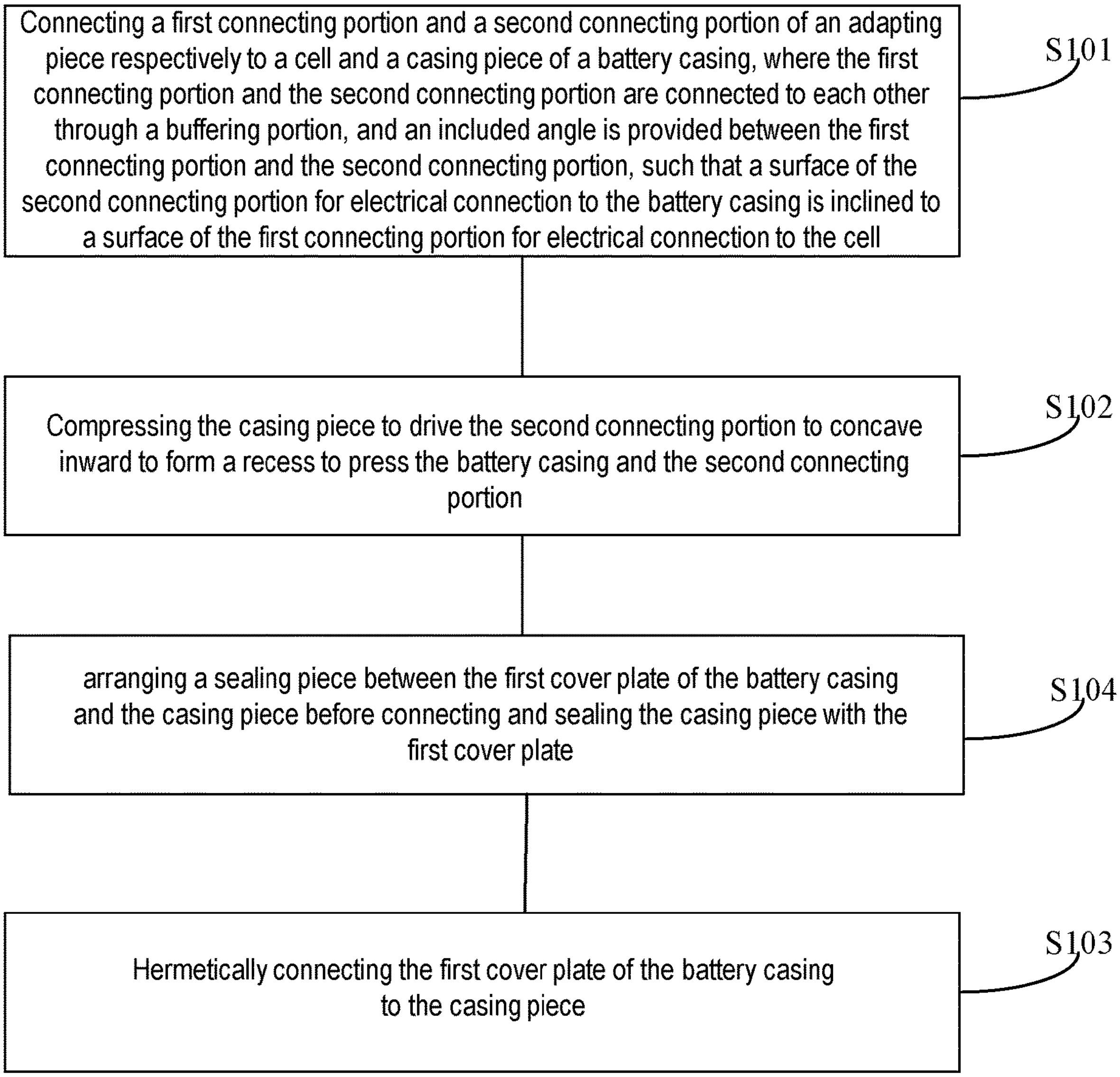
FIG. 15 is a flow chart of another battery manufacturing method according to an exemplary embodiment of the disclosure.

As shown in FIG. 12 and FIG. 13, the support piece 70 is disposed on a surface of the first connecting portion 61 away from the cell 20. The support piece 70 may include a support piece body 72 and the fixing claws 71. The fixing claws 71 are connected to the support piece body 72, and the fixing claws 71 respectively extend into the guide spaces formed by the bending of the buffering portions 63.

Herein, the number of the fixing claws 71 on the support piece 70 may be the same as the number of the buffering portions 63 on the battery connecting member 60, and each of the fixing claws 71 is correspondingly disposed in the guide space of one buffering portion 63. For instance, if the battery connecting member 60 is provided with four buffering portions 63, the support piece 70 may also be provided with four fixing claws 71.

The support piece body 72 may be a cylinder or a structure similar to a cylinder, and the fixing claws 71 are distributed along the circumference. Each of the fixing claws 71 may include a fixing section 711 and a guide section 712. The fixing section 711 is connected to the support piece body 72 and the guide section 712, and the guide section 712 extends into the guide space of the buffering portion 63.

The support piece 70 is made of an insulating material, for example, the material of the support piece 70 may be plastic, rubber, or ceramics.

Figure 7:
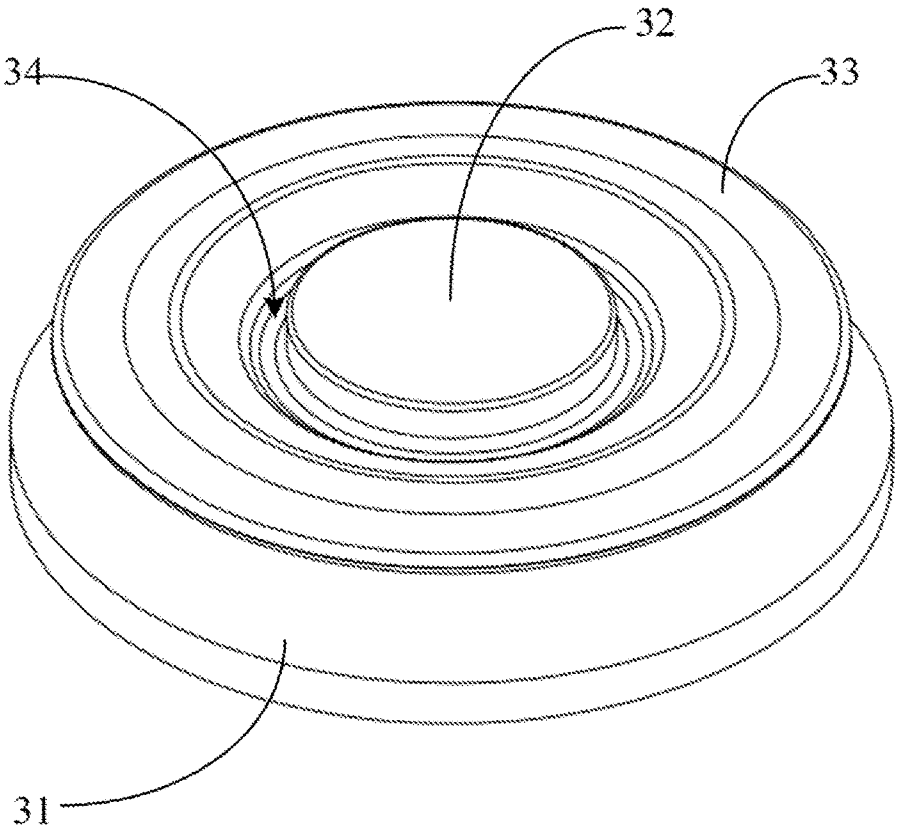
FIG. 7 is a schematic view of a pole assembly according to an exemplary embodiment of the disclosure.

As shown in FIG. 7, the pole assembly 30 includes a body portion 31, a flanging portion 33, and a protruding portion 32. Both the flanging portion 33 and the protruding portion 32 are connected to one end of the body portion 31 close to the cell 20, and at least a portion of the flanging portion 33 and at least a portion of the protruding portion 32 are both located within the battery casing 10. The flanging portion 33 is connected to the battery casing 10, and the protruding portion 32 is electrically connected to the cell 20.

The flanging portion 33 is connected to the battery casing 10, and the protruding portion 32 is connected to the cell 20, so as to realize that the pole assembly 30 is separately connected to the battery casing 10 and the cell 20, the problem of unstable connection of the pole assembly 30 caused by the mutual influence of the battery casing 10 and the cell 20 during connection is prevented from occurring, thus the connection stability of the cell 20 is improved. Further, at least a part of the surface of the flanging portion 33 connected to the battery casing 10 is perpendicular to the axial direction of the cell 20, so that the flanging portion 33 may also be electrically connected to the cell 20, and the overcurrent capability of the cell 20 is improved.

Herein, the pole assembly 30 may pass through the battery casing 10, an installation through hole is provided on the battery casing 10, and the pole assembly 30 is installed in the installation through hole. The body portion 31 at least partially protrudes from one side of the first cover plate 11 away from the cell 20, and the flanging portion 33 and the protruding portion 32 are located in the accommodating cavity of the battery casing 10.

The pole assembly 30 is disposed on the first cover plate 11, the flanging portion 33 is connected to the first cover plate 11, and the flanging portion 33 is at least partially parallel to the first cover plate 11. When the battery includes the second insulating piece 52, the flanging portion 33 is connected to the first cover plate 11 through the second insulating piece 52.

The flanging portion 33 is disposed at one end of the body portion 31 close to the cell and the flanging portion 33 is configured to be connected to the battery casing 10. For instance, the flanging portion 33 may be riveted to the battery casing 10. In the embodiments of the disclosure, the flanging portion 33 is formed by flanging after the pole assembly 30 is installed in the battery casing 10. That is, the flanging portion 33 may be a cylindrical structure coaxially disposed with the protruding portion 32 before assembly, and the diameter of the cylindrical structure is less than the diameter of the installation through hole on the battery casing 10. After the pole assembly 30 is installed in the installation through hole, the flanging portion 33 is formed by pressing the cylindrical structure on pole assembly 30 by stamping or the like.

The protruding portion 32 is disposed at one end of the body portion 31 close to the cell 20, and the protruding portion 32 is configured to be electrically connected to the cell 20. The protruding portion 32 may be connected to the current collecting plate 40, for example, the protruding portion 32 may be connected to the current collecting plate 40 by welding. The welding method of the protruding portion 32 and the current collecting plate 40 may be resistance welding.

Figure 8:
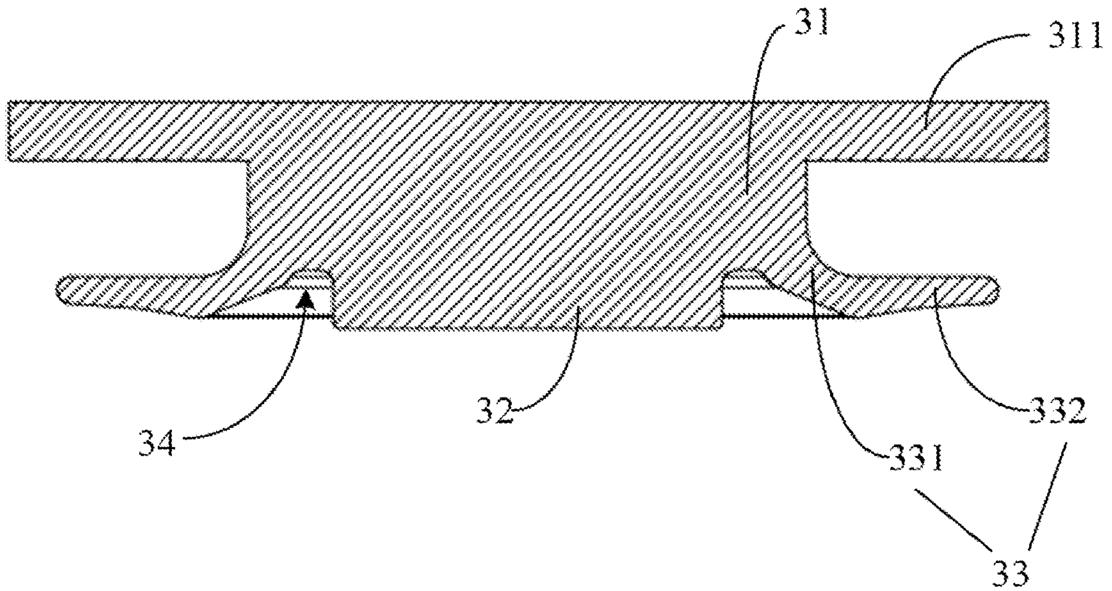
FIG. 8 is a cross-sectional view of the pole assembly according to an exemplary embodiment of the disclosure.

As shown in FIG. 8, the protruding portion 32 and the flanging portion 33 are connected to the same end surface of the body portion 31, and a buffering groove 34 is provided between the flanging portion 33 and the protruding portion 32. By arranging the buffering groove 34 between the flanging portion 33 and the protruding portion 32, the problem of structural damage to the pole assembly 30 due to stress concentration during the riveting process of the flanging portion 33 is prevented. Further, by arranging the buffering groove 34 between the flanging portion 33 and the protruding portion 32, the flanging portion 33 may be easily flanged during flanging, and production efficiency may thus be improved. By isolating the flanging portion 33 and the protruding portion 32 by the buffering groove 34, the mutual influence between the flanging portion 33 and the protruding portion 32 may be avoided during connection, such that the connection stability of the pole assembly 30 may thus be improved.

In a practical embodiment, the flanging portion 33 may be an annular or approximately annular structure, the protruding portion 32 has a columnar structure, and the protruding portion 32 is disposed inside the annular flange portion 33. A gap is provided between the outer wall of the protruding portion 32 and the outer wall of the flanging portion 33, and the gap forms the buffering groove 34. For instance, the flanging portion 33 and the protruding portion 32 may be coaxially arranged, and the maximum diameter of the protruding portion 32 is less than the minimum inner diameter of the flanging portion 33.

The flanging portion 33 may include a transition section 331 and a connection section 332, and the transition section 331 is connected to the body portion 31. The connection section 332 is connected to the transition section 331, and the connection section 332 is located on a side of the transition section 331 away from the body portion 31. The connection section 332 is connected to the battery casing 10, and the surface of the connection section 332 facing the cell is a flat surface.

The transition section 331 extends from the body portion 31 to the connection section 332, the diameter of the transition section 331 may gradually increase in a first direction, and the first direction is the direction from the body portion 31 to the connection section 332 on the battery axis. The diameter of the transition section 331 increases in the first direction to form a flared transition section. The diameter of the transition section 331 in the first direction may be linearly increasing or non-linearly increasing.

In the embodiments of the disclosure, the pole assembly 30 is made of a conductor material, for example, the material of the pole assembly 30 may be aluminum, aluminum alloy, copper, stainless steel, or silver. The material of the pole assembly 30 may be the same as the material of the battery casing 10, or the material of the pole assembly 30 may be different from the material of the battery casing 10, which is not particularly limited by the embodiments of the disclosure.

The first insulating piece 51 is disposed between the battery casing 10 and the pole assembly 30 to achieve insulation between the battery casing 10 and the pole assembly 30. The first insulating piece 51 includes the first insulator 511 and the second insulator 512 which are separately arranged. The first insulator 511 is connected to the pole assembly 30, and the second insulator 512 is connected to the first insulator 511.

Figure 9:
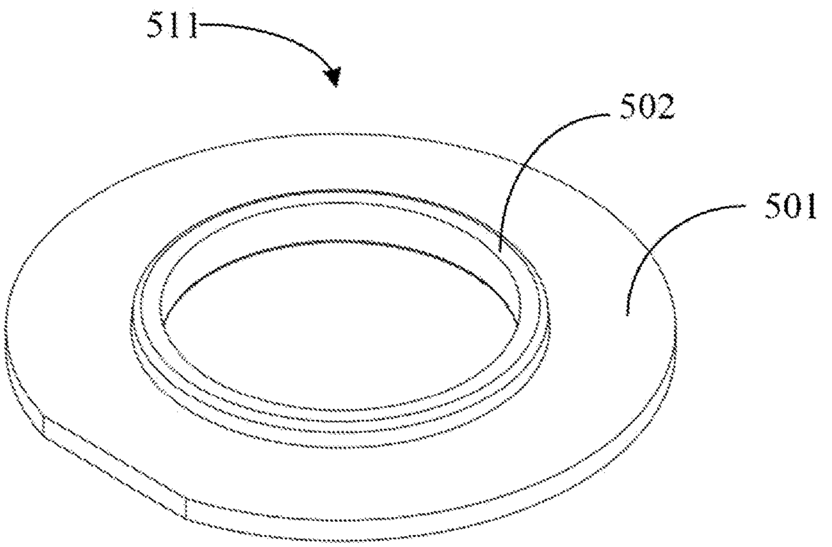
FIG. 9 is a schematic view of a first insulator according to an exemplary embodiment of the disclosure.

As shown in FIG. 9, the first insulator 511 includes a first insulating body 501 and a first insulating protrusion 502, and the first insulating body 501 is sleeved on the pole assembly 30. The first insulating protrusion 502 is disposed on the side of the first insulating body 501 away from the cell 20, and the first insulating protrusion 502 extends into the installation through hole.

Herein, the first insulating body 501 is provided with a through hole, and the pole assembly 30 passes through the through hole. Further, the first insulating body 501 is located between the battery casing 10 and the flanging portion 33, and the flanging portion 33 is connected to the first insulating body 501. For instance, the flanging portion 33 may be riveted to the first insulating body 501.

When the pole assembly 30 is disposed on the first cover plate 11, the first insulating body 501 is disposed between the first cover plate 11 and the flanging portion 33. The through hole on the first insulating body 501 and an installation hole on the first cover plate 11 are in coaxial arrangement, and the first insulating protrusion 502 is arranged on the edge of the through hole of the first insulating body 501 and extends into a first installation hole.

The first insulating protrusion 502 is disposed in the orthographic projection region of the installation through hole on the first insulating body 501, and the first insulating protrusion 502 extends into the installation hole on the first cover plate 11. Based on the above, the diameter of the installation hole on the first cover plate 11 may be greater than the diameter of the body portion 31 of the pole assembly 30, a gap is provided between the inner wall of the installation hole and the body portion 31, and the first insulating protrusion 502 extends into the gap.

Exemplarily, the first insulating body 501 may be a ring structure, the aperture of the first insulating body 501 is less than the aperture of the installation hole, and the aperture of the first insulator 511 matches the diameter of the body portion 31 (the aperture of the first insulator 511 is slightly greater than the diameter of the body portion 31). The first insulating protrusion 502 may also be a ring structure, and the first insulating protrusion 502 is disposed on the side of the first insulating body 501 away from the cell 20. The aperture of the first insulating protrusion 502 and the aperture of the first insulating body 501 are the same and are in coaxial arrangement.

It is noted that in the embodiments of the disclosure, the first insulating body 501 and the first insulating protrusion 502 may be an integral structure, and the first insulator 511 may be formed by injection molding or machining, for example. Certainly, in practical applications, the first insulating body 501 and the first insulating protrusion 502 may also be of a separate structure, and the embodiments of the disclosure are not limited thereto.

The second insulator 512 has an accommodating space 505, and the first insulator 511 is disposed in the accommodating space 505. Based on the above, the first insulator 511 and the second insulator 512 are connected, that is, the first insulator 511 and the second insulator 512 at least partially overlap. In this way, the problem of a gap between the first insulator 511 and the second insulator 512 is avoided, and the insulation performance is improved.

Figure 10:
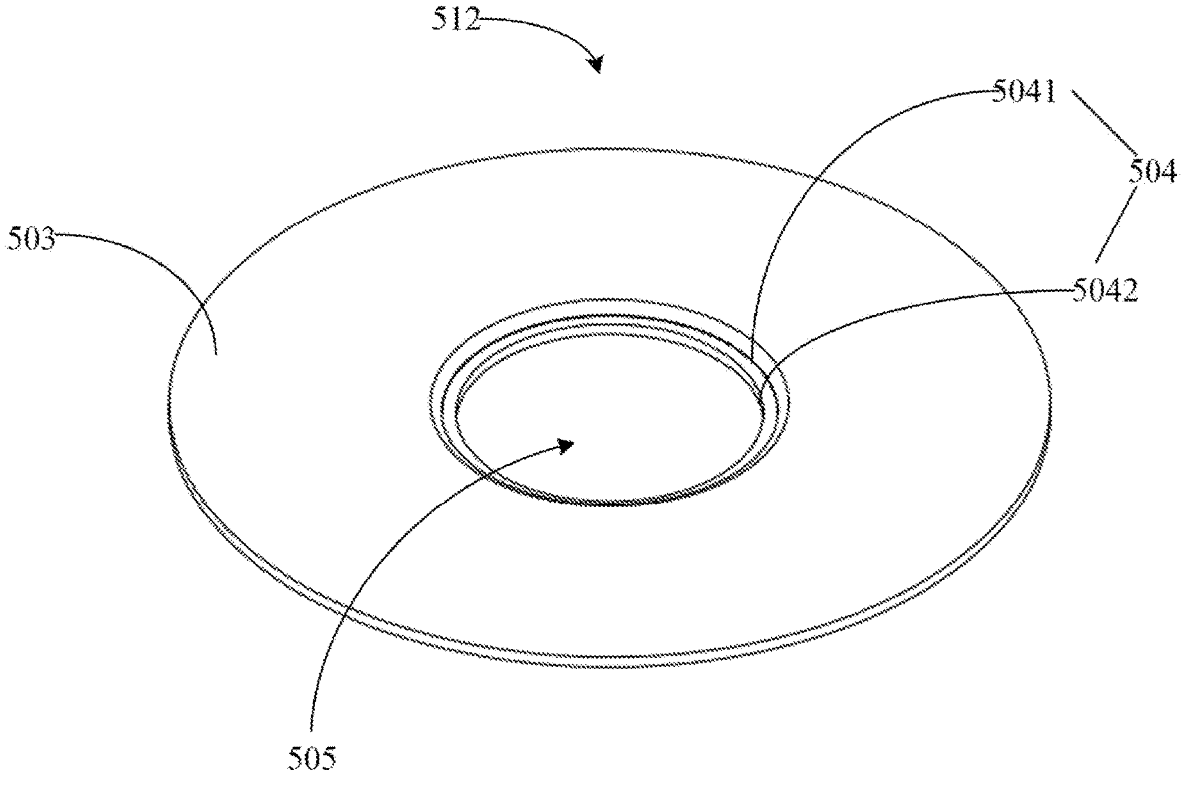
FIG. 10 is a schematic view of a second insulator according to an exemplary embodiment of the disclosure.

As shown in FIG. 10, the second insulator 512 includes a second insulating body 503 and a second insulating protrusion 504, the second insulating body 503 is provided with an accommodating hole, and the accommodating hole forms an accommodating space 505. The second insulating protrusion 504 is disposed on the side of the second insulating body 503 close to the cell 20, and the second insulating protrusion 504 is configured to carry the first insulator 511 in the accommodating hole.

Herein, the second insulating body 503 is provided with a through hole, and the second insulating protrusion 504 is disposed in the through hole. Further, the second insulating body 503 may cover the inner wall of the first cover plate 11 to achieve insulation between the current collecting plate 40 and the battery casing 10. In this way, when the current collecting plate 40 or the battery casing 10 is deformed, a short circuit is prevented from being formed when the battery casing 10 contacts the current collecting plate 40.

The through hole on the second insulating body 503 and the through hole on the first insulating body 501 are coaxially arranged, the second insulating protrusion 504 is disposed on the edge of the through hole of the second insulating body 503, and the second insulating protrusion 504 is located on the side of the first insulating body 501 close to the cell 20.

Exemplarily, the second insulating body 503 may have a ring structure, and the aperture of the second insulating body 503 is greater than the diameter of the first insulating body 501. The second insulating protrusion 504 may also be an annular structure, and the second insulating protrusion 504 and the second insulating body 503 are coaxially arranged.

The second insulating protrusion 504 is configured to carry the first insulator 511, at least a portion of the second insulating protrusion 504 overlaps with the first insulating body 501, and the portion of the second insulating protrusion 504 overlapping with the first insulating body 501 supports the first insulating body 501.

Exemplarily, the second insulating protrusion 504 includes an extending portion 5041 and a carrying portion 5042. The extending portion 5041 is disposed at the edge of the accommodating hole on the second insulating body 503, and the extending portion 5041 extends towards the side of the second insulating body 503 close to the cell 20. The carrying portion 5042 is disposed at one end of the extending portion 5041 away from the second insulating body 503, and the extending portion 5041 extends in a direction close to the axis of the accommodating hole.

The extending portion 5041 may be a ring structure, the extending portion 5041 is located on the side of the second insulating body 503 close to the cell 20, and the inner diameter of the extending portion 5041 and the inner diameter of the through hole on the second insulating body 503 are the same and are concentrically arranged. The carrying portion 5042 is also a ring structure, the carrying portion 5042 is disposed on the inner wall of the extending portion 5041, and the carrying portion 5042 at least partially overlaps with the first insulator 511. For instance, if the diameter of the first insulator 511 is the same as the inner diameter of the extending portion 5041, the carrying portion 5042 and the first insulator 511 are overlapped.

The surface of the carrying portion 5042 close to the cell 20 may be in contact with the current collecting plate 40. Through the contact between the carrying portion 5042 and the current collecting plate 40, the carrying portion 5042 and the current collecting plate 40 may support each other, and the second insulator 512 or the current collecting plate 40 is prevented from being deformed.

It is noted that in the embodiments of the disclosure, the second insulating body 503 and the second insulating protrusion 504 may be an integral structure, for example, the second insulator 512 may be formed by injection molding or machining. Certainly, in practical applications, the second insulating body 503 and the second insulating protrusion 504 may also be of a separate structure, and the embodiments of the disclosure are not limited thereto. For instance, the second insulating body 503 and the second insulating protrusion 504 may be connected by connecting glue to form the second insulator 512.

The second insulating piece 52 is disposed between the battery casing 10 and the pole assembly 30, and the second insulating piece 52 is located on the side of the battery casing 10 away from the cell 20.

The body portion 31 passes through the first cover plate 11, and a limiting portion is provided at one end of the body portion 31 away from the protruding portion 32. The limiting portion protrudes from the surface of the first cover plate 11 away from the cell 20, and the second insulating piece 52 is located between the battery casing 10 and the limiting portion.

Herein, the second insulating piece 52 is sleeved on the body portion 31 and is located on the side of the first cover plate 11 away from the cell 20. The limiting portion protrudes from the first cover plate 11, the second insulating piece 52 is located between the limiting portion and the first cover plate 11, and the insulation between the limiting portion and the battery casing 10 is achieved through the second insulating piece 52.

Exemplarily, the installation through hole on the first cover plate 11 may be a circular hole, and a limiting protrusion 311 and the body portion 31 form a stepped cylindrical structure. The diameter of the limiting protrusion 311 is greater than the diameter of the installation through hole, and the diameter of the body portion 31 is less than the diameter of the installation hole. The second insulating piece 52 has a ring structure, and the inner diameter of the second insulating piece 52 is matched with the diameter of the body portion 31.

In the embodiments of the disclosure, the insulating pieces may be made of plastic, rubber, or ceramics materials, and the materials of the first insulating piece 51 and the second insulating piece 52 may be the same or different. The materials of the first insulator 511 and the second insulator 512 may be the same or different, which are not particularly limited by the embodiments of the disclosure.

Figure 11:
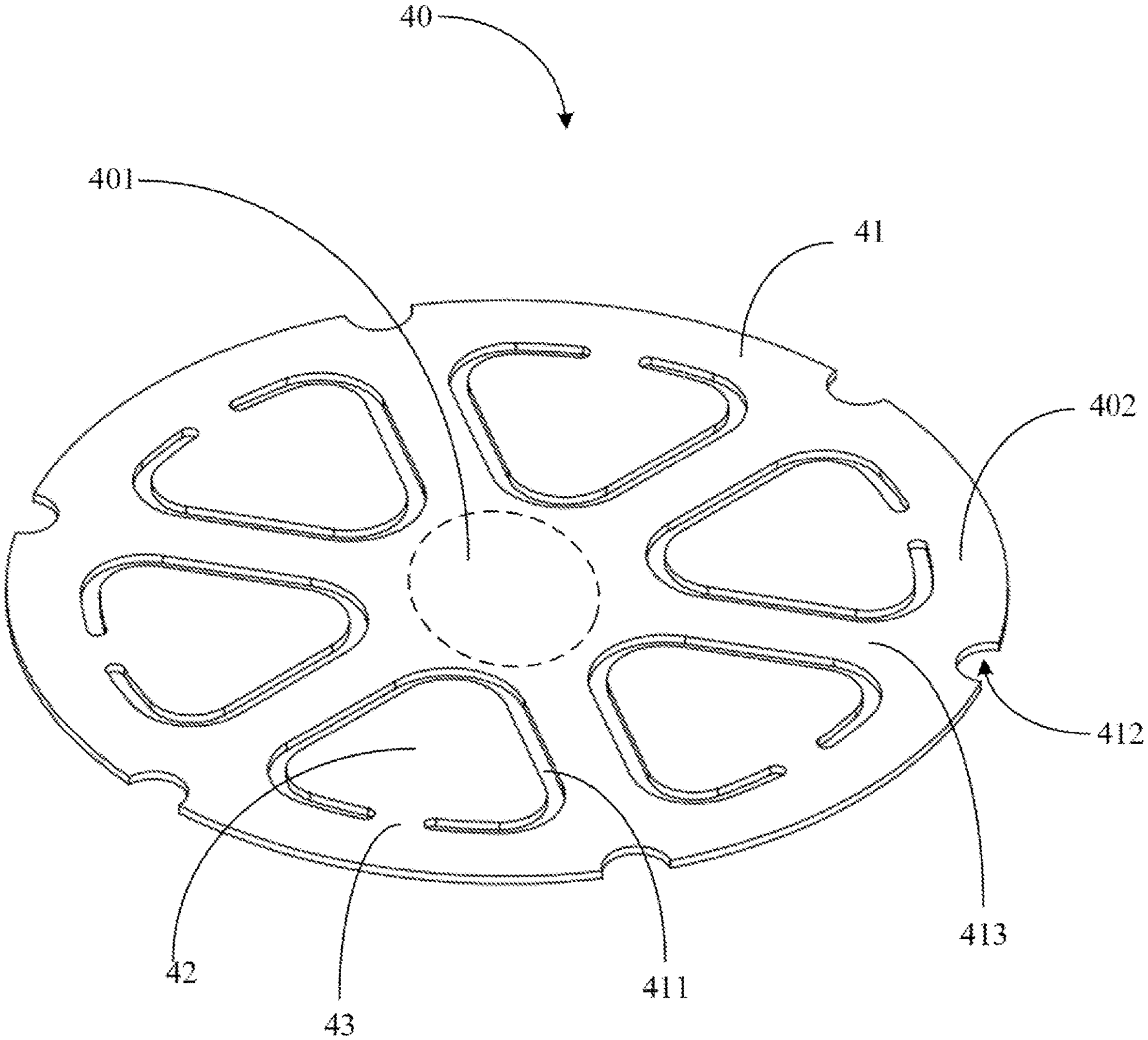
FIG. 11 is a schematic view of a current collecting plate according to an exemplary embodiment of the disclosure.

As shown in FIG. 11, the current collecting plate 40 includes a current collecting plate body 41 and cantilevers 42. The current collecting plate body 41 includes a first connecting region 401 and a second connecting region 402, the first connecting region 401 is configured to be connected to the pole assembly 30, and the second connecting region 402 is provided with cantilever holes 411 penetrating the current collecting plate body 41. The cantilevers 42 are connected to the current collecting plate body 41 and are respectively located in the cantilever holes 411, a gap is provided between each of the cantilevers 42 and the current collecting plate body 41, and the cantilevers 42 are configured to be connected to the cell 20.

The shape of the first connecting region 401 may match the shape of the connection between the pole assembly 30 and the current collecting plate 40. For instance, the cylindrical protruding portion 32 is disposed on the pole assembly 30, and the protruding portion 32 is configured to be connected to the current collecting plate 40. As such, the shape of the first connecting region 401 on the current collecting plate body 41 may also be circular, and the area of the first connecting region 401 is greater than or equal to the area of the connection surface of the protruding portion 32. Further, the position of the protruding portion 32 corresponds to the position of the first connecting region 401, that is, the orthographic projection of the protruding portion 32 on the current collecting plate 40 is located in the first connecting region 401.

The pole assembly 30 and the first connecting region 401 may be connected by welding, for example, the pole assembly 30 and the first connecting region 401 may be connected by resistance welding. Certainly, in practical applications, the connection manner of the pole assembly 30 and the first connecting region 401 may also be other manners, which are not specifically limited in the embodiments of the disclosure.

The second connecting region 402 is provided with the cantilever holes 411 penetrating the current collecting plate body 41, and the cantilevers 42 are respectively connected in the cantilever hole 411. When a plurality of cantilever holes 411 are provided on the current collecting plate body 41, one cantilever 42 is correspondingly provided in each cantilever hole 411. In the current collecting plate body 41, the plurality of cantilever holes 411 may be evenly distributed in the circumferential direction, and based on the above, the plurality of cantilevers 42 are also evenly distributed in the circumferential direction.

The cantilever holes 411 are located inside the second connecting region 402 to avoid the cantilever holes 411 and the outer edge of the current collecting plate body 41 from intersecting. That is, the cantilever holes 411 and the edge of the current collecting plate 40 are spaced at a predetermined distance. By arranging the cantilever holes 411 inside the second connecting region 402, the integrity of the current collecting plate 40 may be ensured, the strength of the current collecting plate 40 may be ensured, and the current collecting plate 40 may be prevented from being damaged during the manufacturing and transportation processes.

In practical applications, the distance between one end of the cantilever hole 411 close to the edge of the current collecting plate body 41 and the edge of the current collecting plate body 41 may change gradually. It needs to be ensured that the minimum distance between the end of the cantilever hole 411 close to the edge of the current collecting plate body 41 and the edge of the current collecting plate body 41 needs to be greater than or equal to a predetermined distance. For instance, the predetermined distance may be 1 mm, 1.5 mm, 2 mm, or 3 mm.

The second connecting region 402 at least partially surrounds the first connecting region 401. For instance, the second connecting region 402 may surround the first connecting region 401. The first connecting region 401 is a circular region, the second connecting region 402 may be a ring region, and the first connecting region 401 is embedded in the inner ring of the second connecting region 402. Certainly, in practical applications, the first connecting region 401 and the second connecting region 402 may also have other positional relationships, and the embodiments of the disclosure are not limited thereto. For instance, the first connecting region 401 is located on one side of the second connecting region 402, and the first connecting region 401 and the second connecting region 402 are arranged in parallel.

Exemplarily, the current collecting plate 40 is a current collecting plate 40 applied to a cylindrical battery, and based on the above, the current collecting plate body 41 is a disk-shaped structure. The first connecting region 401 is a circular region with the center of the current collecting plate body 41 as the center of the circle, and the second connecting region 402 is a circular ring concentric with the first connecting region 401. The cantilever hole 411 is a triangular or approximately triangular hole, or the cantilever hole 411 is a fan-shaped or approximately fan-shaped hole. The plurality of cantilever holes 411 are distributed along the circumference, for example, the plurality of cantilever holes 411 are evenly distributed along the circumference. Spacing regions 413 are provided between adjacent cantilever holes 411 among the plurality of cantilever holes 411, and when the plurality of cantilever holes 411 are evenly distributed, the shapes of the plurality of spacing regions 413 are the same.

Positioning notches 412 may also be provided on the current collecting plate body 41. The positioning notches 412 are provided on the edge of the current collecting plate body 41, and the positioning notches 412 correspond to the spacing regions 413. The spacing regions 413 are located between two adjacent cantilever holes 411 in the second connecting region 402. The positioning notches 412 are configured to provide positioning during welding, and the positioning notches 412 may act as a positioning structure for taking the material when the current collecting plate 40 is installed.

For instance, when the current collecting plate 40 is installed, the current collecting plate is transferred from the placement station to the installation station by a manipulator. The manipulator can hold the positioning notches 412 of the current collecting plate 40, and when the manipulator performs machine vision recognition, the positioning holes may be used as an identification feature. When the current collecting plate 40 and the cell 20 are welded and the current collecting plate 40 and the pole assembly 30 are welded, a welding robot can identify and locate the current collecting plate 40 through the positioning notches 412.

The cantilever 42 is connected to the current collecting plate body 41 and is located in the cantilever hole 411, a gap is provided between the cantilever 42 and the current collecting plate body 41, and the cantilever 42 is configured to be connected to the cell 20. At least one tab is provided on the cell 20, and the tab is connected to the cantilever 42. For instance, the tab and the cantilever 42 are connected by welding.

The cantilever 42 has a fixed end and a free end, the free end is close to the first connecting region 401, a gap is provided between the free end and the current collecting plate body 41, and the fixed end is connected to the current collecting plate body 41. The free end of the cantilever 42 may be connected to the tab, and the free end of the cantilever 42 may be deformed when being subjected to an external force. Therefore, when the tab exerts a force on the cantilever 42 due to such as the concentration of gravitational force, the force may be counteracted by the deformation of the cantilever 42 to avoid damage to the connection between the tab and the cantilever 42, such that the connection stability of the tab and the cantilever 42 is thereby improved.

When the current collecting plate 40 is circular, the cantilever 42 may be approximately triangular or fan-shaped. The width of the cantilever 42 gradually increases in the direction away from the first connecting region 401, and the width of the cantilever 42 is the distance between the two sides extending from the fixed end to the free end of the cantilever 42. Certainly, in practical applications, the cantilever 42 may also exhibit other structures, and the embodiments of the disclosure are not limited thereto. For instance, the cantilever 42 may also be a rectangular strip-shaped structure or the like.

Further, in order to increase the flexibility of the cantilever 42, the current collecting plate 40 provided by the embodiments of the disclosure may further include a connecting portion 43. The connecting portion 43 is connected to the fixed end and the current collecting plate body 41, and the width of the connecting portion 43 is less than the width of the fixed end of the cantilever 42.

By configuring the width of the connecting portion 43 to be less than the width of the fixed end of the cantilever 42, the current collecting plate 40 may have greater flexibility at the connecting portion, which is beneficial to the deformation of the free end of the cantilever 42, such that the connection strength between the cantilever 42 and the tab is further improved.

In the embodiments of the disclosure, the current collecting plate 40 is made of a conductor material, for example, the material of the current collecting plate 40 may be one or more of copper, aluminum, silver, titanium, steel, aluminum alloy, and titanium alloy.

It is noted that in the embodiments of the disclosure, the current collecting plate 40 may be an integral structure, and the cantilever 42 may be a structure on the current collecting plate body 41 separated by cutting a groove with one end being suspended. For instance, a substantially V-shaped or U-shaped through groove may be formed by cutting through a circular plate, and the cantilever 42 is formed in the region inside the through groove. Alternatively, the current collecting plate 40 may also be of a split structure, and the cantilever hole 411 penetrating the current collecting plate body 41 may be provided on the current collecting plate body 41, and the cantilever 42 may be connected to the corresponding position of the cantilever hole 411 by welding or the like.

The battery provided by the embodiments of the disclosure includes the battery connecting member 60. The first connecting portion 61 and the second connecting portion 62 in the battery connecting member 60 are respectively configured to be connected to the cell 20 and the battery casing 10. The first connecting portion 61 and the second connecting portion 62 are connected to each other through the buffering portion 63, so that the cell 20 is connected to the battery casing 10. Further, the surface of the second connecting portion 62 configured to be electrically connected to the battery casing 10 is inclined to the first connecting portion 61, and in this way, the connection area between the second connecting portion 62 and the battery casing 10 increases, the overcurrent capability is improved, and the connection stability between the battery casing 10 and the battery connecting member 60 is raised.

The exemplarily embodiments of the disclosure further provide a battery manufacturing method, and as shown in FIG. 10, the battery manufacturing method includes the following steps.

In step S101, a first connecting portion and a second connecting portion of a battery connecting member are respectively connected to a cell and a casing piece of a battery casing. The first connecting portion and the second connecting portion are connected to each other through a buffering portion. An included angle is provided between the first connecting portion and the second connecting portion, such that a surface of the second connecting portion for electrical connection to the battery casing is inclined to a surface of the first connecting portion for electrical connection to the cell.

In step S102, the casing piece is compressed to drive the second connecting portion to concave inward to form a recess to press the battery casing and the second connecting portion.

In step S103, the first cover plate of the battery casing is hermetically connected to the casing piece.

In the battery manufacturing method provided by the embodiments of the disclosure, the first connecting portion 61 is connected to the cell 20, the second connecting portion 62 is connected to the battery casing 10, and in this way, the battery casing 10 is connected to the cell 20. Further, by compressing the battery casing 10 to drive the second connecting portion 62 to form a recess extending inward, the connection area and connection stability of the battery casing and the second connecting portion 62 may be improved.

Further, as shown in FIG. 11, the battery manufacturing method provided by the embodiments of the disclosure may further include the following step.

In step S104, a sealing piece is arranged between the first cover plate of the battery casing and the casing piece before hermetically connecting the first cover plate of the battery casing to the casing piece.

Each of the steps of the battery manufacturing method provided by the embodiments of the disclosure is described in detail as follows.

The battery manufacturing method provided by the embodiments of the disclosure may be used to manufacture the battery provided by the embodiments of the disclosure. Regarding the structure of each component mentioned in the battery manufacturing method, reference may be made to the structure of each component of the battery in the above-mentioned embodiments.

In step S101, the first connecting portion 61 and the second connecting portion 62 of the battery connecting member 60 are respectively connected to the cell 20 and the battery casing 10. The first connecting portion 61 and the second connecting portion 62 are connected to each other through the buffering portion 63. An included angle is provided between the first connecting portion 61 and the second connecting portion 62, such that the surface of the second connecting portion 62 for electrical connection to the battery casing 10 is inclined to the surface of the first connecting portion 61 for electrical connection to the cell 20.

The first connecting portion 61 and the cell 20 may be connected by welding, and the second connecting portion 62 and the battery casing 10 may be connected by welding. Certainly, in practical applications, the first connecting portion 61 and the cell 20 may also be connected by means of engaging, bonding, or the like. The second connecting portion 62 and the battery casing 10 may also be connected by means of engaging, bonding, or the like.

In a practical embodiment, before the battery connecting member 61 is installed in the battery casing 10, the pole assembly 30, the cell 20, the first insulating piece 51, the second insulating piece 52, and the current collecting plate 40 have already been installed in the battery casing 10 to form a semi-finished battery. The battery connecting member 60 is installed on the basis of the semi-finished battery.

It can be understood that in other feasible embodiments, the battery connecting member 60 may also be connected to the battery casing 10 before the pole assembly 30, the cell 20, the first insulating piece 51, the second insulating piece 52, and the current collecting plate 40 are installed in the battery casing 10.

In step S102, the casing piece 12 is compressed to drive the second connecting portion 62 to concave inward to form a recess, so as to press the battery casing 10 and the second connecting portion 62.

In a feasible embodiment of the disclosure, the battery connecting member 60 may include a plurality of second connecting portions 62 and a plurality of buffering portions 63, and the plurality of second connecting portions 62 are arranged at intervals. Each of the second connecting portions 62 is correspondingly connected to one of the buffering portions 63, and the other end of the buffering portion 63 is connected to the first connecting portion.

Based on the above, step S102 may be implemented in the following manner. The casing piece 12 is compressed to drive a plurality of second connecting portions 62 to gather inward. The spacing between adjacent second connecting portions 62 among the second connecting portions 62 is reduced and the buffering portions 63 are deformed during the compressing process. Further, during the compressing process, the compressed portions of the battery casing 10 and the second connecting portions 62 may be inwardly depressed.

Herein, the casing piece 12 may be pressed inwards at the portion where the casing piece 12 and the second connecting portion 62 are connected by means of hemming. The casing piece 12 is deformed by the inward pressing force, and the casing piece 12 presses the second connecting portion 62, and the second connecting portion 62 also deforms inwardly. By pressing, the second recess 121 is formed on the casing piece 12, the first recess 621 is formed on the second connecting portion 62, and the first recess 621 is matched with the second recess 121, so that sealing of the battery casing 10 and the battery connecting member 60 is achieved.

That is, in the embodiments of the disclosure, each second connecting portion 62 has an initial state and a compressed state. The diameter of the circle formed by the plurality of second connecting portions 62 in the initial state is greater than the diameter of the circle formed by the plurality of second connecting portions 62 in the compressed state.

When the casing piece 12 presses the second connecting portion 62, a part of the force received by the second connecting portion 62 is transmitted to the buffering portion 63, and the buffering portion 63 is deformed. The buffering portion 63 may have elasticity, and the deformation of the buffering portion 63 may be elastic deformation. The buffering portion 63 may apply a force to the second connecting portion 62 in the opposite direction, so as to press the second connecting portion 62 and the casing piece 12 tightly.

The fixing claw 71 is provided between the buffering portion 63 and the first connecting portion 61. The deformation direction of the buffering portion 63 is guided by the fixing claw 71, so that the buffering portion 63 is deformed in a direction away from the cell 20 when being deformed, such that the buffering portion 63 is prevented from contacting the cell 20.

In another feasible embodiment of the disclosure, the second connecting portion 62 may be a complete annular structure, and the second connecting portion 62 is connected to the first connecting portion 61 through a plurality of buffering portions 63. Based on the above, step S102 may be implemented in the following manner. The casing piece 12 is compressed, such that the second connecting portion 62 is driven to be deformed. During the compressing process, a recess is formed on the second connecting portion 62, the second connecting portion 62 retracts inward, and the buffering portion 63 is deformed.

Through arrangement of the spacings among a plurality of second connecting portions 62, it can be ensured that a space for retraction is provided when the battery connecting member retracts from a large circle to a small circle, thus interference is prevented from occurring, and the retraction of the battery connecting member 60 is facilitated.

Herein, the casing piece 12 may be pressed inwards at the portion where the casing piece 12 and the second connecting portion 62 are connected by means of hemming. The casing piece 12 is deformed by the inward pressing force, and the casing piece 12 presses the second connecting portion 62, and the second connecting portion 62 is also deformed inwardly (from a circular ring with a large diameter to a circular ring with a small diameter). By pressing, the second recess 121 is formed on the casing piece 12, the first recess 621 is formed on the second connecting portion 62, and the first recess 621 is matched with the second recess 121, so that sealing of the battery casing 10 and the battery connecting member 60 is achieved.

That is, in the embodiments of the disclosure, each second connecting portion 62 has an initial state and a compressed state, and the diameter of the circle formed by the second connecting portions 62 in the initial state is greater than the diameter of the circle formed by the second connecting portions 62 in the compressed state.

When the casing piece 12 presses the second connecting portion 62, a part of the force received by the second connecting portion 62 is transmitted to the buffering portion 63, and the buffering portion 63 is deformed. The buffering portion 63 may have elasticity, and the deformation of the buffering portion 63 may be elastic deformation. The buffering portion 63 may apply a force in the opposite direction to the second connecting portion 62, so as to press the second connecting portion 62 and the casing piece 12 tightly.

In step S103, the first cover plate 11 of the battery casing 10 is hermetically connected to the casing piece 12.

The first cover plate 11 of the battery casing 10 may be hermetically connected to the casing piece 12 by flanging and riveting. Exemplarily, the casing piece 12 extending in the vertical direction may be bent (the bending may be shared with the second recess 121 or may be a separate bending), such that a part of the casing piece 12 protrudes towards the inner side of the battery casing 10. The end portion of the casing piece 12 is bent a second time, so that the casing piece 12 and the first cover plate 11 are hermetically connected to each other.

When the first cover plate 11 is connected to the battery casing 10, the first cover plate 11 contacts the buffering portion 63, and a predetermined preload force is provided between the first cover plate 11 and the buffering portion 63 to press the battery connecting member 60 through the first cover plate 11. The tightly-pressed buffering portion 63 may apply pressure to the second connecting portion 62, so as to ensure the pressing between the second connecting portion 62 and the battery casing 10.

In step S104, a sealing piece is arranged between the first cover plate 11 of the battery casing 10 and the casing piece 12 before hermetically connecting the first cover plate 11 to the casing piece 12.

Herein, the sealing piece may be a sealing gasket or a sealing ring or the like. By arranging a sealing piece between the first cover plate 11 and the casing piece 12, the outflow of the electrolyte in the battery may be avoided, and the foreign impurities may also be prevented from entering the inside of the battery.

In step S103, when the first cover plate 11 is connected to the casing piece 12, a predetermined pressure may be applied to the buffering portion 63. Therefore, step S103 may be implemented in the following manner. The first cover plate 11 is arranged on a predetermined position of the casing piece 12, such that the first cover plate 11 applies a predetermined pressure to the buffering portion 62, and that the first cover plate 11 is hermetically connected to the casing piece 12.

In the battery manufacturing method provided by the embodiments of the disclosure, the first connecting portion 61 is connected to the cell 20, and the second connecting portion 62 is connected to the battery casing 10, so as to realize that the battery casing 10 is connected to the cell 20. Further, by compressing the battery casing 10 to drive the second connecting portion 62 to form a recess extending inward, the connection area and connection stability of the battery casing 10 and the second connecting portion 62 may be improved.

The battery provided by the embodiments of the disclosure may be applied to an electric vehicle. When the battery is applied in an electric vehicle, a plurality of batteries may be integrated into a battery pack, and the battery pack is installed on the electric vehicle to provide energy to the electric vehicle.

Herein, the battery pack may include a box body and a plurality of batteries, the plurality of batteries are arranged in the box body, and the box body is configured to support and protect the batteries. A busbar may also be provided in the battery box, and the busbar may be connected to the battery pole assembly to achieve the series or parallel connection of a plurality of batteries.

In practical applications, the battery pack may be mounted on the frame of the electric vehicle. The battery pack may be fixedly connected to the frame. Alternatively, the battery pack may be a modular battery pack, and the modular battery pack may be detachably connected to the vehicle body for easy replacement.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery connecting member, configured to electrically connecting a cell and a battery casing of a battery, the battery connecting member comprising:

a first connecting portion, configured to be electrically connected to the cell;

a second connecting portion, configured to be electrically connected to the battery casing;

a buffering portion, wherein two ends of the buffering portion are respectively connected to the first connecting portion and the second connecting portion, and the buffering portion is an elastic piece buffering portion, wherein an included angle is provided between the first connecting portion and the second connecting portion, such that a surface of the second connecting portion for electrical connection to the battery casing is inclined to a surface of the first connecting portion for electrical connection to the cell, the buffering portion has a bent sub-portion, and the bent sub-portion protrudes from a surface of the first connecting portion away from the cell to form a guide space between the buffering portion and the first connecting portion, and the guide space is configured to accommodate a fixing claw, the battery includes a support piece made of an insulating material and disposed on the surface of the first connecting portion away from the cell, wherein a plurality of the fixing claws are disposed on the support piece, the fixing claws are located on a side of the buffering portion facing the cell, and the fixing claws are engaged with the first connection portion, the fixing claws are disposed in the guide space formed by the buffering portion and the first connecting portion.

2. The battery connecting member according to claim 1, wherein the battery connecting member comprises a plurality of the second connecting portions, and the second connecting portions are arranged at intervals.

3. The battery connecting member according to claim 2, wherein a distance between two adjacent second connecting portions among the second connecting portions is 2 mm to 20 mm.

4. The battery connecting member according to claim 2, wherein the battery connecting member comprises a plurality of the buffering portions, and each of the buffering portions is correspondingly connected to one of the second connecting portions.

5. The battery connecting member according to claim 4, wherein the first connecting portion comprises:

a connecting body; and a plurality of connecting sheets, connected to the connecting body, wherein a spacing is provided between adjacent connecting sheets among the connecting sheets, and the connecting sheets are configured to be connected to the cell, wherein the buffering portions are connected to the connecting body, and the buffering portions are located between the adjacent connecting sheets.

6. The battery connecting member according to claim 5, wherein a minimum distance between adjacent two of the connecting sheets is 3 mm to 15 mm.

7. The battery connecting member according to claim 1, wherein a width of the buffering portion is 2 mm to 10 mm, and/or a length of the buffering portion is 5 mm to 20 mm.

8. The battery connecting member according to claim 1, wherein the included angle between the first connecting portion and the second connecting portion is 90 degrees.

9. The battery connecting member according to claim 1, wherein the second connecting portion has a first recess extending inward, and a side of the second connecting portion facing the buffering portion is an inner side.

10. A battery, comprising the battery connecting member according to claim 1.

11. The battery according to claim 10, further comprising:

a battery casing; and a cell, disposed inside the battery casing, wherein the first connecting portion and the second connecting portion of the battery connecting member are respectively connected to the cell and the battery casing.

12. The battery according to claim 10, wherein the battery casing comprises:

a first cover plate; and a casing piece, connected to the first cover plate, wherein the casing piece is provided with a second recess extending inward, and the second recess is matched with a first recess of the second connecting portion to allow the battery casing and the battery connecting member to be connected and sealed.

13. The battery according to claim 12, wherein the first cover plate contacts the buffering portion, and a predetermined preload force is provided between the first cover plate and the buffering portion to press the battery connecting member through the first cover plate.

14. The battery according to claim 10, wherein the battery is a cylindrical battery.

* * * * *